United States Patent
Ko et al.

(10) Patent No.: US 9,171,653 B2
(45) Date of Patent: Oct. 27, 2015

(54) LITHIUM MANGANESE COMPOSITE OXIDE AND METHOD FOR PREPARING SAME

(75) Inventors: Hyoung-Shin Ko, Gumi-si (KR); Tae-Won Kim, Daejeon (KR)

(73) Assignee: POSCO ES MATERIALS CO., LTD., Gumi-si, Gyeongsangbuk-do (KR)

( * ) Notice: Subject to any disclaimer, the term of this patent is extended or adjusted under 35 U.S.C. 154(b) by 92 days.

(21) Appl. No.: 13/883,653

(22) PCT Filed: Nov. 7, 2011

(86) PCT No.: PCT/KR2011/008407
§ 371 (c)(1),
(2), (4) Date: Jun. 14, 2013

(87) PCT Pub. No.: WO2012/064053
PCT Pub. Date: May 18, 2012

(65) Prior Publication Data
US 2013/0327978 A1    Dec. 12, 2013

(30) Foreign Application Priority Data

Nov. 8, 2010 (KR) .................. 10-2010-0110166

(51) Int. Cl.
*H01B 1/08* (2006.01)
*C01G 45/12* (2006.01)
*C01G 53/00* (2006.01)
(Continued)

(52) U.S. Cl.
CPC ............... *H01B 1/08* (2013.01); *C01D 15/02* (2013.01); *C01G 45/1242* (2013.01); *C01G 53/54* (2013.01); *H01G 11/04* (2013.01); *H01G 11/30* (2013.01); *H01M 4/0471* (2013.01); *H01M 4/131* (2013.01); *H01M 4/1391* (2013.01); *H01M 4/485* (2013.01); *H01M 4/505* (2013.01); *C01P 2002/54* (2013.01); *H01M 10/052* (2013.01); *Y02E 60/122* (2013.01); *Y02E 60/13* (2013.01); *Y02T 10/7011* (2013.01); *Y02T 10/7022* (2013.01)

(58) Field of Classification Search
CPC ... H01M 4/505; H01M 4/485; H01M 4/0471; H01M 4/131; H01M 4/1391; C01G 45/1242; C01G 45/54; C01G 53/54; C01D 15/02; H01B 1/08; H01G 11/04; H01G 11/30
See application file for complete search history.

(56) References Cited

U.S. PATENT DOCUMENTS 6,692,665 B2 * 2/2004 Shima et al. ............... 252/518.1
2003/0235528 A1 12/2003 Wu et al.

FOREIGN PATENT DOCUMENTS

CN  101462773 A  6/2009
JP  11-189419 A  7/1999
(Continued)

OTHER PUBLICATIONS

International Search Report of PCT/KR2011/008407 mailed Jul. 9, 2012.

*Primary Examiner* — Mark Kopec
*Assistant Examiner* — Matthew R Diaz
(74) *Attorney, Agent, or Firm* — Lucas & Mercanti, LLP

(57) ABSTRACT

The present invention relates to a lithium manganese composite oxide and a method for preparing the same, and more particularly, to a lithium manganese composite oxide and a method for preparing same, in which a wet-milling process and a spray-drying process are applied, and the abundance ratio of $Mn^{3+}$ ions to $Mn^{4+}$ ions at the surface of the composite oxide is adjusted by controlling an oxidizing atmosphere during heat treatment.

8 Claims, 5 Drawing Sheets

(51) Int. Cl.
  *H01G 11/04* (2013.01)
  *H01G 11/30* (2013.01)
  *H01M 4/131* (2010.01)
  *H01M 4/1391* (2010.01)
  *H01M 4/485* (2010.01)
  *H01M 4/505* (2010.01)
  *H01M 4/04* (2006.01)
  *C01D 15/02* (2006.01)
  *H01M 10/052* (2010.01)

(56) References Cited

FOREIGN PATENT DOCUMENTS

| | | |
|---|---|---|
| JP | 2001-202959 A | 7/2001 |
| JP | 2002-063900 A | 2/2002 |
| JP | 2005-029424 A | 2/2005 |
| JP | 4090950 B2 | 5/2008 |

\* cited by examiner

LITHIUM MANGANESE COMPOSITE OXIDE AND METHOD FOR PREPARING SAME

CROSS-REFERENCES TO RELATED APPLICATION

This patent application is a 371 of PCT/KR2011/008407, filed on Nov. 7, 2011, which claims the benefit of Korean Patent Application No. 10-2010-0110166, filed on Nov. 8, 2010, the contents of each which are incorporated herein by reference.

FIELD OF THE INVENTION

The present invention relates to lithium manganese composite oxide and a method for preparing the same, and more particularly to a lithium manganese composite oxide, wherein the abundance ratio of $Mn^{3+}$ ions to $Mn^{4+}$ ions at the surface thereof is adjusted, and a method for preparing the same.

BACKGROUND OF THE INVENTION

Lithium ion batteries are secondary batteries, which are characterized by high energy density and possibility to obtain relatively high voltage, and multiply used for compact electronic devices such as a notebook computer, a video camera, a digital camera and a mobile phone. Also, it becomes promising as power sources of large equipments such as electric automobiles and distributed-type power sources of families in the future.

As anode active materials used for the lithium ion batteries, the conventional lithium composite oxides such as $LiCoO_2$, $LiNiO_2$ and $LiMn_2O_4$ are representative, and among them, the $LiMn_2O_4$ having a spinel structure is excellent in safety and advantageous in cost because it uses manganese, which is rich resource. Accordingly, it is receiving the attention as an anode material for a lithium ion battery.

However, the $LiMn_2O_4$ caused structural distortion called Jahn-Teller distortion resulted from $Mn^{3+}$, and when using a manganese oxide containing $Mn^{3+}$ was used as an anode active material for a lithium secondary battery, its life characteristic was bad at high temperature of 55° C. or more due to manganese elution.

Many technical improvements have been studied to overcome these problems. For example, in order to improve cycle characteristic of $LiMn_2O_4$, a method for substituting a part of Mn in the $LiMn_2O_4$ with hetero atoms was known. Japanese Patent Laid-Open Publication No. H11-189419 (Patent Reference 1) disclosed that, in a lithium manganese composite oxide having a spinel structure and expressed by composition formula $Li_{1+x}Mn_{2-y}M_yO_{4+z}$, 16 d site is doped with a trivalent metal such as Co, Cr and Al, and the doping with the trivalent metal is very useful because it controls capacity reduction at a minimum. However, this substitution method had a limit because it could not reduce $Mn^{3+}$ ions abundance.

SUMMARY OF THE INVENTION

In order to solve the above-described problems associated with prior art, the present invention is objected to provide a lithium manganese composite oxide, wherein the abundance ratio of $Mn^{3+}$ ions to $Mn^{4+}$ ions at the surface of the lithium manganese composite oxide is adjusted to a certain range, and a method for preparing the same.

In order to accomplish one object of the present invention, the present invention provides a lithium manganese composite oxide expressed by the following chemical formula 1, wherein oxidation number of Mn is 3+ and 4+, and the abundance ratio of $Mn^{3+}$ ions to $Mn^{4+}$ ions at the surface thereof, A, defined by the following relation formula 1, is 95 to 100:

$$Li_{1+a}Mn_{2-x}M_xO_4 \quad \text{[Chemical Formula 1]}$$

(wherein, a is 0 to 0.2, x is 0 to 0.4, and M is selected from the group consisting of Al, Mg, Zr, Cu, Ni, Sn, Sr, Zn, Si and a mixture thereof); and $$A=\{Mn^{4+} \text{ ion abundance}/(Mn^{3+} \text{ ion abundance}+Mn^{4+} \text{ ion abundance})\}\times 100. \quad \text{[Relation Formula 1]}$$

The present invention further provides an electrochemical device comprising the lithium manganese composite oxide expressed by chemical formula 1. The electrochemical device includes a lithium secondary battery or a hybrid capacitor.

The present invention further provides a method for preparing a lithium manganese composite oxide expressed by the above chemical formula 1, which comprises: (a) a step of inserting a lithium source, a manganese source and a metal source; (b) a step of manufacturing mixed slurry by mixing a wet-milling medium thereto followed by wet-milling thereof; (c) a step of producing a precursor particle by spray drying the mixed slurry of the step (b); and (d) a step of heat treating the precursor of the step (c).

The present invention is characterized in that the mixed slurry of the step (b) has particle diameter of 0.3 μm or less and viscosity of 500 cps or less.

The present invention is characterized in that the wet-milling of the step (b) is performed by stirring at a speed of 3000 to 4000 rpm for 30 to 60 min, and the spray drying of the step (c) is performed in the form of pneumatic spray at a pressure condition of 1 to 5 bars.

Further, the present invention is characterized in that the heat treating of the step (d) is performed by raising temperature to a temperature of 700 to 1000° C. at a temperature raising speed of 1° C./min to 5° C./min, followed by injecting air for 1 to 10 hrs at a speed of 1 to 10 L/min.

Hereinafter, the present invention will be described in detail.

The present invention provides a lithium manganese composite oxide expressed by the following chemical formula 1, wherein oxidation number of Mn is 3+ and 4+, and the abundance ratio of $Mn^{3+}$ ions to $Mn^{4+}$ ions at the surface thereof, A, defined by the following relation formula 1, is 95 to 100, and a method for preparing the same:

$$Li_{1+a}Mn_{2-x}M_xO_4 \quad \text{[Chemical Formula 1]}$$

(wherein, a is 0 to 0.2, x is 0 to 0.4, and M is selected from the group consisting of Al, Mg, Zr, Cu, Ni, Sn, Sr, Zn, Si and a mixture thereof); and $$A=\{Mn^{4+} \text{ ion abundance}/(Mn^{3+} \text{ ion abundance}+Mn^{4+} \text{ ion abundance})\}\times 100. \quad \text{[Relation Formula 1]}$$

The present invention provides a method for preparing the lithium manganese composite oxide, which satisfies the conditions of the Chemical Formula 1 and Relation Formula 1 by applying a wet-milling process and a spray-drying process followed by controlling oxidizing atmosphere in a step of heat treatment.

The method for preparing the same of the present invention comprises: (a) a step of inserting a lithium source, a manganese source and a metal source; (b) a step of manufacturing a mixed slurry by mixing and wet-milling the wet-milling mediator; (c) a step of producing a precursor particle by spray drying the mixed slurry of the step (b); and (d) a step of heat treating the precursor of the step (c).

In the method of the present invention, it is characterized that the lithium source, which can be used in the step (a), is at least one selected from the group consisting of lithium carbonate, lithium nitrate, lithium oxide and lithium chloride, and preferably, it may be lithium carbonate.

Further, it is characterized that the manganese source, which can be used in the step (a), is at least one selected from the group consisting of manganese dioxide, gamma($\gamma$)-manganese dioxide, alpha($\alpha$)-manganese dioxide, beta($\beta$)-manganese dioxide and manganese oxide ($Mn_2O_3$, $Mn_3O_4$), preferably manganese dioxide.

In the present invention, it is preferred that, besides the lithium source and the manganese source, the M as a metal source is at least one transition metal compound selected from the group consisting of Al, Mg, Zr, Cu, Ni, Sn, Sr, Zn and Si compounds.

The wet-milling of the step (b) of the present invention is characterized by performed by stirring at a speed of 3000 to 4000 rpm, preferably 3800 rpm, for 30 to 60 min, preferably 40 min. When the stirring condition is out of the said range, it may be difficult to control particle size as described below.

The wet-milling processed mixed slurry of the step (b) of the present invention is characterized by being 0.3 μm or less in particle diameter. When the average diameter excesses 0.3 μm, the battery performance such as rate characteristic or output characteristic may be deteriorated due to bad influence to powder packing ability or lowered specific surface area.

Further, it is preferred that the viscosity of the wet-milling processed mixed slurry of the step (b) may be 500 cps or less. When the viscosity is increased over 500 cps, it may be difficult to continuously process wet-grinding due to breakdown of a slurry supplying pump and nozzle blocking.

It is preferred that the spray drying of the step (c) of the present invention may be conducted by a spray drying method in terms of uniformity of the produced particles, powder fluidity, powder handling performance, effective production of dried particles. Among the spray drying methods, the spray drying can be conducted by a method selected from pneumatic spray, rotational spray, ultrasonic spray and flame spray, preferably pneumatic spray, at a pressure condition of 1 to 5 bars, preferably 2.5 bars.

The heat treating of the step (d) of the present invention can be performed by raising temperature to a temperature of 700 to 1000° C., preferably 800 to 900° C., at a temperature raising speed of 1° C./min to 5° C./min, preferably 3° C./min, followed by injecting air for 1 to 10 hrs at a speed of 1 to 10 L/min under oxidative condition.

In the heat treatment process, when the temperature raising speed, the reaction temperature, the reaction time and the air speed are out of the above range, it may be difficult to control the abundance ratio of $Mn^{3+}$ ions to $Mn^{4+}$ ions on the surface like the [relation formula 1].

The present invention provides a method for preparing a lithium manganese composite oxide: which is manufactured in a state, wherein the grinding condition and oxidative atmosphere when heat-treating are controlled; expressed by the following chemical formula 1, wherein oxidation number of Mn is 3+ and 4+, and the abundance ratio of $Mn^{3+}$ ions to $Mn^{4+}$ ions at the surface thereof, A, defined by the following relation formula 1, is 95 to 100:

$Li_{1+a}Mn_{2-x}M_xO_4$ [Chemical Formula 1]

(wherein, a is 0 to 0.2, x is 0 to 0.4, and M is selected from the group consisting of Al, Mg, Zr, Cu, Ni, Sn, Sr, Zn, Si and a mixture thereof); and A={$Mn^{4+}$ ion abundance/($Mn^{3+}$ ion abundance+$Mn^{4+}$ ion abundance)}×100. [Relation Formula 1]

In the relation formula 1, it is preferred that the value A, which is the abundance ratio of $Mn^{3+}$ ions to $Mn^{4+}$ ions at the surface, may be controlled within the range of 95 to 100. When the value A is less than 95, the relative abundance of the $Mn^{3+}$ ions becomes high. Thereby, cycle characteristic may be deteriorated by structural degradation.

Advantageous Effects of the Invention

The method for preparing a lithium manganese composite oxide of the present invention and the lithium manganese composite oxide manufactured therefrom are excellent in charging/discharging cycle characteristic because the structural problem caused by $Mn^{3+}$ by controlling the $Mn^{3+}$ ions abundance on the surface.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, the method for preparing a lithium manganese composite oxide of the present invention and the lithium manganese composite oxide prepared thereby will be described in further detail with reference to examples, and the scope of the present invention cannot be limited thereby in any way.

Example 1

$Li_2CO_3$ as a lithium source, $MnO_2$ as a manganese source and $Al(OH)_3$ or $Mg(OH)_2$ as a hetero metal M were weighed based on 400 g according to the required stoichiometric ratio, and the added to distilled water at the solid/liquid ratio of 4:6. The resulting solution was stirred in a stirrer at 400 rpm for 10 min, and then ground in a wet grinder (Product Name: Netzsch, Mincer) at 3800 rpm for 40 min so as to obtain ground particles having particle size (D50) of 0.3 μm or less and viscosity of 500 cps or less. For the wet grinder, Zirconia beads having diameter of 0.65 mm were used.

The ground mixed slurry was put into a Lab-scale spray dryer (Ein System, Input temp.: 270~300° C., Output temp.: 100-120° C.), and droplets were generated by using a pneumatic atomizer-type sprayer at a pressure of 2.5 bar to obtain spherical-type anode active material precursor particles.

Then, an anode active material precursor containing the lithium was put into a crucible in a certain amount and heated to the temperature of 850° C. at the rate of 3° C./min followed by calcining at the temperature for 6 hrs. Unit particle size (primary particle) of the manufactured anode active material was 2.5 μm, and tap density was 1.8 g/cm².

Example 2

The procedure of Example 1 was repeated except for injecting air at the rate of 1 L/min when heat treating.

Example 3

The procedure of Example 1 was repeated except for injecting air at the rate of 3 L/min when heat treating.

Example 4

The procedure of Example 1 was repeated except for injecting air at the rate of 5 L/min when heat treating.

Comparative Example $LiMn_2O_4$, now available in the market as an anode active material of a lithium secondary battery, was used.

Test Example 1

ESR (Electron Spin Resonance Spectroscopy) Analysis

Figure 1:
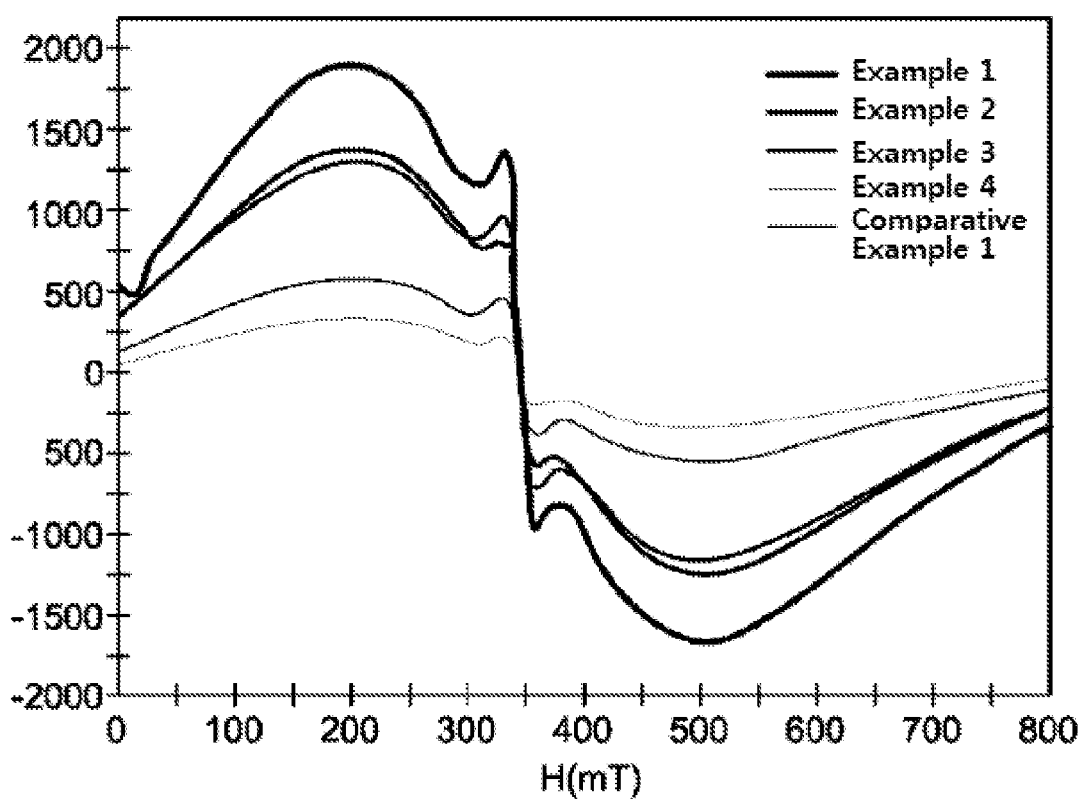
FIG. 1: ESR analysis data of the anode active materials prepared in Examples 1 to 4 and the anode active material of Comparative Example.

Oxygen deficiency of the anode active materials prepared in Examples 1 to 4 was analyzed by ESR, and the results were shown in FIG. 1.

Electron Spin Resonance spectroscopy (ESR) analysis is a technique for analyzing selective absorption of electromagnetic radiation of weak radio frequency by unpaired electron, which is in an atomic structure of a material in a certain strong magnetic field, and the higher peak result means that there are many unpaired electrons in an atomic structure of the subject material. At the time of chemical bonding of the $LiMn_2O_4$, oxygen deficiency is generated, and thus, calcination in the air is a general method. Because a rate of oxygen deficiency in the $LiMn_2O_4$ is proportional to a ratio of $Mn^{3+}$, the amount of $Mn^{3+}$ can be relatively identified by relatively comparing the rate of oxygen deficiency through the ESR analysis. Namely, the higher peak in an ESR graph represents the higher oxygen deficiency rate, and it means the higher $Mn^{3+}$ ratio.

As shown in FIG. 1, it could be confirmed that Example 1 showed the highest peak, and Example 4 showed the lowest peak. Namely, it could be confirmed that as increasing the speed of input air, the peak height and the $Mn^{3+}$ ratio become lower.

Test Example 2

XPS Analysis

X-ray photoelectron spectroscopy is a useful tool for finding oxidation state of various atoms in solid phase. Oxidation numbers of Mn atoms on the surface of anode active materials, $Li_{1+a}Mn_{2-x}M_xO_4$, manufactured in Examples 1 to 4 and a product of Comparative Examples 1, which is now available in the market, were decided by Curve-fitting technique of Mn $2P_{3/2}$ spectrum of XPS analysis, and the results were listed in the following Table 1.

TABLE 1

| | $Mn^{3+}$ (%) | $Mn^{4+}$ (%) | A |
|---|---|---|---|
| Example 1 | 99.99 | 0.01 | 0.01 |
| Example 2 | 84.52 | 15.48 | 15.48 |
| Example 3 | 51.20 | 48.80 | 48.80 |
| Example 4 | 0.02 | 99.98 | 99.98 |
| Comparative Example 1 | 9.31 | 90.69 | 90.69 |

It could be confirmed that Example 4 showed lower $Mn^{3+}$ ions abundance ratio on the surface than Comparative Example 1 using a commercial oxidative manganese composite oxide, and thereby having higher A value.

Figure 2A:
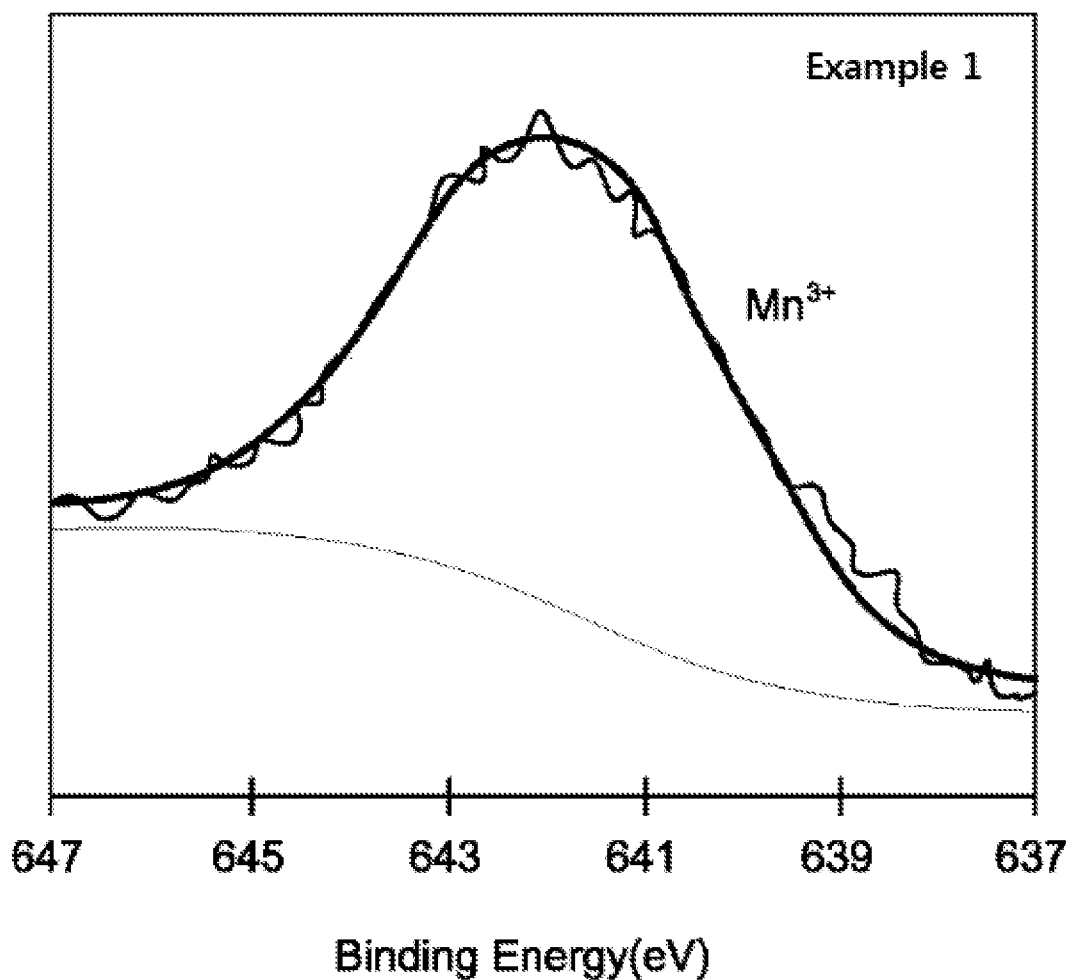
FIG. 2: the result of Mn(2P) spectrum using XPS.
Figure 2B:
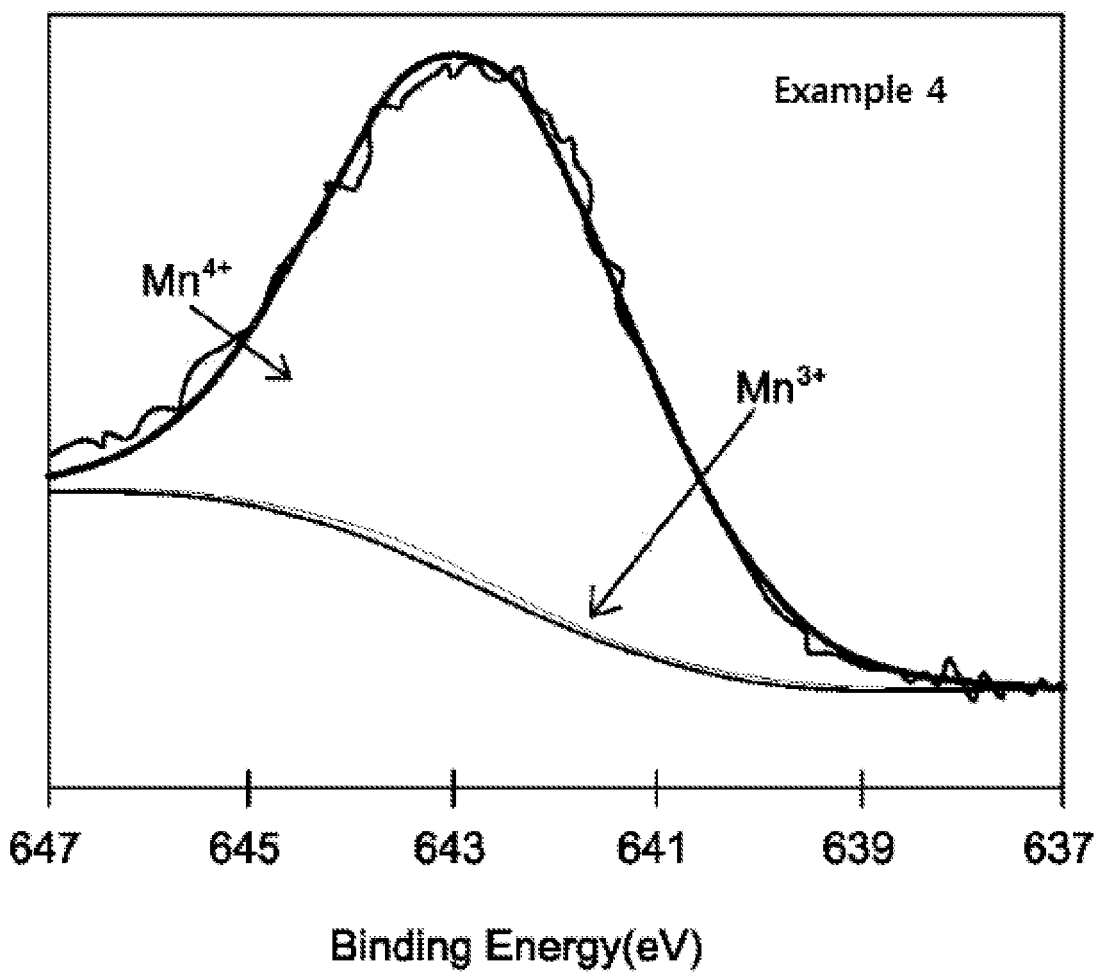
Figure 2C:
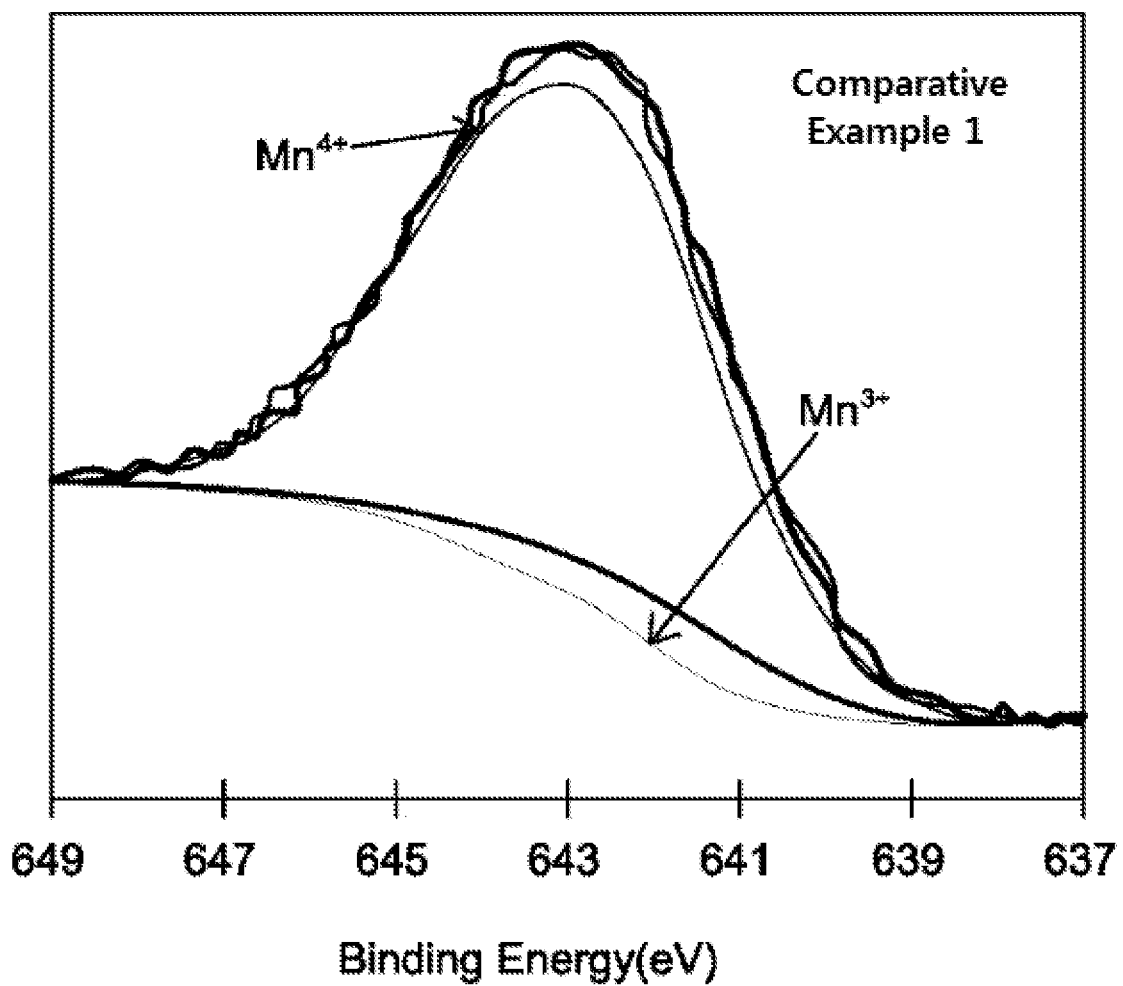

Of the results, the results of Example 1, Example 4 and Comparative Example 1 were shown in FIG. 2. It could be found that the oxidation number of the Mn atom was determined according to the oxygen content on the surface of the anode material, and the fact that A value of Example 4 was 99.98 compared with the commercial product of Comparative Example 1 means that most of them are $Mn^{4+}$.

Preparation Example

The anode active materials prepared in Examples 1 to 4, carbon black (Denka Black) as a conducting material and polyvinylidene fluoride (PVDF) as a binder were added at a ratio of 94:3:3, and homogeneously mixed followed by adding N-methylpyrrolidone (NMP) 12 ml as a solvent, so as to prepare a homogeneous mixture. The mixture was uniformly coated on an aluminum foil of thickness of 20 μm, dried at 130° C. for 1 hr, compressed with a pressure of 1 ton by using a chromium-coated roll press, and dried in a vacuum oven of 100° C. for 12 hrs.

A coin battery was manufactured by using the prepared anode and a lithium foil as counter electrodes, a porous polyethylene film (SK, thickness: 20 μm) as a separator, and a liquid electrolyte, wherein $LiPF_6$ was dissolved in a mixed solvent of ethylene carbonate and ethyl methyl carbonate (volume ratio of 1:2) at a concentration of 1 M, according to a commonly known manufacturing process.

Test Example 3

Cycle Characteristic

Figure 3:
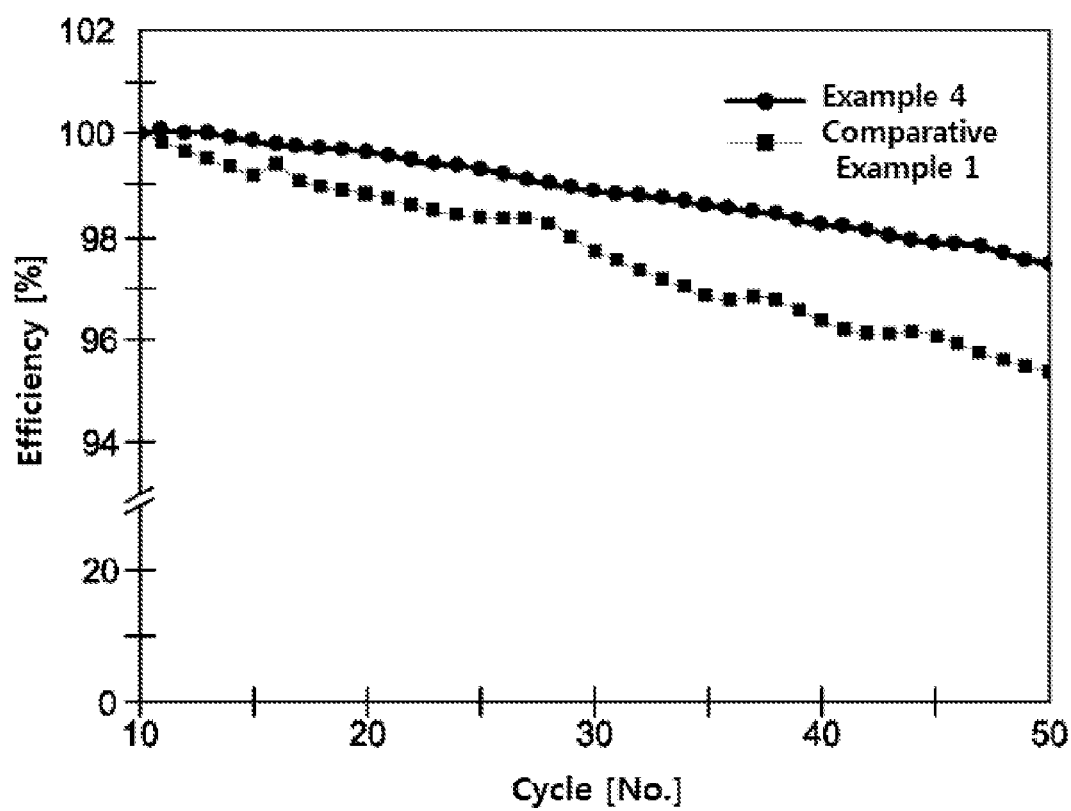
FIG. 3: a drawing showing life characteristic of the batteries using the anode active materials prepared in Examples 1 to 4 and the anode active material of comparative Example.

In order to evaluate electrochemical characteristics of test cells manufactured with the anode active materials of Examples 1 to 4 and Comparative Example 1, an electrochemical analyzer (TOSCAT 3100, Toyo System Co., Ltd.) was used, and charging/discharging test was conducted by Cut-off at a range of 4.3~3 V by applying a discharge rate of 0.1 C at 25° C., and the results were illustrated in FIG. 3.

As shown in FIG. 3, Example 4, wherein input amount of air was 5 L/min, showed 97.5% efficiency at $50^{th}$ cycle, but the commercial product of Comparative Example 1 showed about 91.5% efficiency.

INDUSTRIAL APPLICABILITY

The method for preparing a lithium manganese composite oxide of the present invention and the lithium manganese composite oxide manufactured therefrom are excellent in charging/discharging cycle characteristic because the structural problem caused by $Mn^{3+}$ by controlling the $Mn^{3+}$ ions abundance on the surface.

While the invention has been described with respect to the above specific embodiments, it should be recognized that various modifications and changes may be made and also fall within the scope of the invention as defined by the claims that follow.

What is claimed is:

1. A lithium manganese composite oxide comprising a compound represented by chemical formula 1,
    wherein the compound represented by chemical formula 1 comprises Mn having an oxidation number of +3 and Mn having an oxidation number of +4, and the abundance ratio of Mn having an oxidation number of +3 to Mn having an oxidation number of +4 at the surface of the lithium manganese composite oxide, A, defined by relation formula 1, is 95 to 100:

$$Li_{1+a}Mn_{2-x}M_xO_4 \quad \text{[Chemical Formula 1]}$$

wherein, a is 0 to 0.2, x is 0 to 0.4, and M is selected from the group consisting of Al, Mg, Zr, Cu, Ni, Sn, Sr, Zn, Si and a mixture thereof; and A={Mn having an oxidation number of +4 abundance/ (Mn having an oxidation number of +3 abundance Mn having an oxidation number of +4 abundance) }×100 [Relation Formula 1].

2. An electrochemical device comprising the lithium manganese composite oxide of claim 1.

3. The electrochemical device according to claim 2, which is a lithium secondary battery or a hybrid capacitor.

4. A method for preparing a lithium manganese composite oxide comprising:
  (a) a step of inserting a lithium source, a manganese source and a metal source;
  (b) a step of manufacturing a mixed slurry by wet milling the lithium source, the manganese source and the metal source;
  (c) a step of producing a precursor particle by spray drying the mixed slurry of the step (b); and
  (d) a step of heat treating the precursor of the step (c), wherein the method prepares the lithium manganese composite oxide of claim 1.

5. The method for preparing a lithium manganese composite oxide according to claim 4, wherein the mixed slurry of the step (b) has particle diameter of 0.3 μm or less and viscosity of 500 cps or less.

6. The method for preparing a lithium manganese composite oxide according to claim 4, wherein the wet-milling of the step (b) is performed by stirring at a speed of 3000 to 4000 rpm for 30 to 60 min.

7. The method for preparing a lithium manganese composite oxide according to claim 4, wherein the spray drying of the step (c) is performed in the form of pneumatic spray at a pressure condition of 1 to 5 bar.

8. The method for preparing a lithium manganese composite oxide according to claim 4, wherein the heat treating of the step (d) is performed by raising temperature to a temperature of 700 to 1000° C. at a temperature raising speed of 1° C./min to 5° C./min, followed by injecting air for 1 to 10 hours at a speed of 1 to 10 L/min.

* * * * *